(12) United States Patent
Melone et al.

(10) Patent No.: US 12,466,542 B2
(45) Date of Patent: Nov. 11, 2025

(54) HELICOPTER, HELICOPTER KIT AND ASSOCIATED RECONFIGURATION METHOD

(71) Applicant: LEONARDO S.P.A., Rome (IT)

(72) Inventors: Stefano Melone, Samarate (IT);
Gabriele Campanardi, Samarate (IT);
Luca Medici, Samarate (IT);
Alessandro Scandroglio, Samarate (IT); Riccardo Bianco Mengotti, Samarate (IT)

(73) Assignee: LEONARDO S.P.A., Rome (IT)

( * ) Notice: Subject to any disclaimer, the term of this patent is extended or adjusted under 35 U.S.C. 154(b) by 133 days.

(21) Appl. No.: 17/911,544

(22) PCT Filed: Mar. 19, 2021

(86) PCT No.: PCT/IB2021/052324
§ 371 (c)(1),
(2) Date: Sep. 14, 2022

(87) PCT Pub. No.: WO2021/186411
PCT Pub. Date: Sep. 23, 2021

(65) Prior Publication Data
US 2023/0174219 A1      Jun. 8, 2023

(30) Foreign Application Priority Data
Mar. 19, 2020   (EP) ...................................... 20164164

(51) Int. Cl.
*B64C 5/02* (2006.01)
*B64C 27/04* (2006.01)
*B64C 27/82* (2006.01)

(52) U.S. Cl.
CPC ................ *B64C 5/02* (2013.01); *B64C 27/04* (2013.01); *B64C 27/82* (2013.01); *B64C 2027/8281* (2013.01)

(58) Field of Classification Search
CPC .... B64C 5/02; B64C 5/06; B64C 5/08; B64C 27/82; B64C 27/8281; B64C 39/06; B64C 39/062; B64C 39/068
See application file for complete search history.

(56) References Cited

U.S. PATENT DOCUMENTS 2,194,596 A * 3/1940 Henter ..................... B64C 39/10
244/45 R
5,388,785 A * 2/1995 Rollet ..................... B64C 27/82
244/17.19

(Continued)

FOREIGN PATENT DOCUMENTS

EP          2878536 A1      6/2015

OTHER PUBLICATIONS

International Search Report and Written Opinion in corresponding International Patent Application No. PCT/IB2021/052324, mailed May 21, 2021 (13 pages).

*Primary Examiner* — William L Gmoser
(74) *Attorney, Agent, or Firm* — Leason Ellis LLP

(57) ABSTRACT

A helicopter is described comprising a fuselage elongated along a first axis and extending between a nose and a tail boom; a tailplane with a pair of first aerodynamic surfaces elongated along a second axis; the first and second axis define a first plane; the helicopter comprises a pair of elements transversal to the first aerodynamic surfaces; and a pair of second aerodynamic surfaces generating respective second aerodynamic forces, connected to first elements, and facing and spaced from respective first aerodynamic surfaces; each second aerodynamic surface comprises one first root end connected to the respective said element, a second (Continued)

free end spaced from said tail boom, a first leading edge, a first trailing edge opposite to said first leading edge, a first chord at said first root end and a second chord at said second free end parallel to said first axis; the first and the second chord define a second plane tilted with respect to said first plane.

15 Claims, 5 Drawing Sheets

(56) References Cited

U.S. PATENT DOCUMENTS

| | | | | |
|---|---|---|---|---|
| 6,474,604 B1 * | 11/2002 | Carlow | ................ | B64C 39/062 |
| | | | | 244/45 R |
| 7,644,892 B1 * | 1/2010 | Alford, Jr. | ............ | B64C 23/065 |
| | | | | 244/35 R |
| 8,382,041 B1 * | 2/2013 | Yechout | ................ | B64C 23/069 |
| | | | | 244/199.4 |
| 8,657,226 B1 * | 2/2014 | McGinnis | ................ | B64C 39/08 |
| | | | | 244/45 R |
| 8,882,024 B1 * | 11/2014 | McCollough | ............ | B64C 27/82 |
| | | | | 244/17.19 |
| 8,985,500 B2 | 3/2015 | Borie et al. | | |
| D736,140 S * | 8/2015 | Moller | ......................... | D12/330 |
| D976,799 S * | 1/2023 | Cummings | .................... | D12/319 |
| 11,554,860 B1 * | 1/2023 | Ricci Moretti | ........ | B64C 27/82 |
| 2008/0223991 A1 * | 9/2008 | Mann | .................... | B64C 23/069 |
| | | | | 244/199.4 |
| 2011/0024573 A1 * | 2/2011 | Kirk | ...................... | B64C 23/069 |
| | | | | 244/199.4 |
| 2015/0307182 A1 * | 10/2015 | Mores | .................... | B64C 27/82 |
| | | | | 244/17.13 |
| 2016/0068258 A1 * | 3/2016 | Seywald | ................ | B64C 3/385 |
| | | | | 244/199.4 |
| 2021/0122460 A1 * | 4/2021 | Acee | .................... | B64D 35/04 |

* cited by examiner

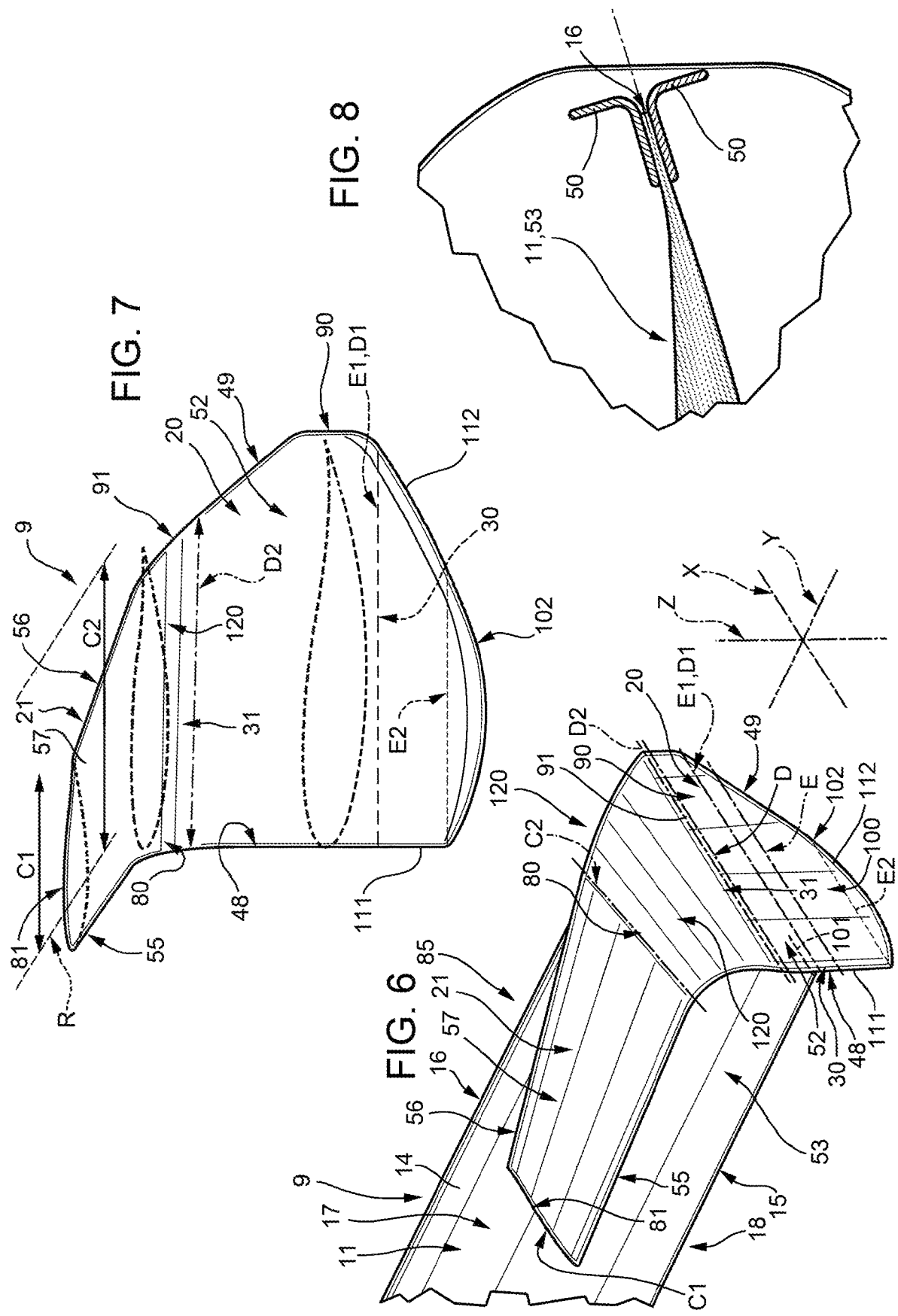

HELICOPTER, HELICOPTER KIT AND ASSOCIATED RECONFIGURATION METHOD

CROSS-REFERENCE TO RELATED APPLICATIONS

This patent application is a U.S. National Phase Application under 35 U.S.C. § 371 of International Patent Application No. PCT/IB2021/052324, filed on Mar. 19, 2021, which claims priority from European patent application no. 20164164.4, filed on Mar. 19, 2020, all of which are incorporated by reference, as if expressly set forth in their respective entireties herein.

TECHNICAL FIELD

The present invention relates to a helicopter, a helicopter kit and a helicopter reconfiguration method.

BACKGROUND ART

Helicopters comprise, in a known manner, a fuselage, a main rotor projecting from the fuselage and rotatable about a first axis, and a tail rotor projecting from the fuselage and rotatable about a second axis transversal to the first axis.

In particular, the main rotor is adapted to provide the lift necessary to sustain the helicopter in the air and to allow the forward/backward and lateral movement of the helicopter. The tail rotor is instead adapted to counter the rotation of the helicopter that would be caused by the reaction torque transmitted to the fuselage by operation of the main rotor, and to control the helicopter's yaw, i.e. the rotation about the first axis.

Helicopters Also Comprise, in a Known Manner:
 - a nose and a tail boom arranged on respectively opposite ends of the fuselage;
 - a fin projecting upwards in a cantilever fashion from a tail boom of the fuselage and supporting the tail rotor in a rotatable manner about the second axis; and
 - a tailplane projecting in a cantilever fashion from the tail boom, laterally to the fuselage, and known as a pitch-stabilizer.

The tailplane is configured as a wing profile that generates, when the helicopter is in forward flight, a first aerodynamic force, lift/negative lift, with a main component directed parallel to the first axis.

This lift/negative lift is added to the lift generated by the main rotor and is effective in keeping the helicopter's attitude in stable conditions during high-speed forward flight, i.e. in ensuring that the helicopter is in a position of stable equilibrium with reference to the vertical direction and to the rotation about a third longitudinal axis of the helicopter. In particular, the third axis è parallel to a direction of extension of the fuselage oriented from a nose to the tail boom and is transversal to the first and second axes.

However, in certain low-speed conditions, it can happen that the airflow directed downwards by the main rotor is deviated towards the tail of the fuselage, striking the tailplane, and thus generating a third aerodynamic force, namely a downward thrust thereon.

Following acceleration and/or deceleration of the helicopter, this thrust causes a nose-up attitude on the helicopter, i.e. an attitude in which the nose of the fuselage is higher than the tail of the fuselage. This nose-up attitude must be continually corrected by the pilot acting on the cyclic pitch of the main rotor, i.e. by tilting the main rotor disc forwards so as to move the airflow away from the tailplane.

This makes flight control difficult for the pilot in certain low-speed conditions.

Moreover, the nose-up attitude in the landing phase causes visibility problems for the pilot, which can become even more problematic in cases of gusty wind, poor weather conditions or the presence of obstacles in the landing area.

Due to the above, the design of the tailplane must satisfy two conflicting constraints.

In greater detail, on one hand, a large tailplane surface is required to generate an adequate value for the first aerodynamic force and therefore increase the longitudinal stability of the helicopter. On the other hand, a small tailplane surface is optimal at low speed to reduce the surface exposed to the downward airflow generated by the main rotor and the amount of the helicopter's consequent nose-up, and therefore improves the helicopter's visibility and maneuverability in particularly critical conditions, such as landing.

Due to these constraints, various tailplane configurations have been used on helicopters starting from the 1950s without achieving an optimal solution. For example, there are known asymmetric tailplanes that are arranged on only one side of the fuselage and at different heights with respect to the tail boom, and symmetrical solutions with two stabilizers arranged at different heights and different longitudinal positions with respect to the fuselage.

U.S. Pat. No. 8,985,500 Describes a Helicopter Comprising a Tailplane Comprising:
 - a pair of stabilizers, projecting in a cantilever fashion from a respective side of the tail boom;
 - a pair of aerodynamic appendages superimposed on the respective stabilizers and projecting in a cantilever fashion from a respective side of the fuselage; and
 - a pair of end plates opposite to the respective sides and extending between each stabilizer and the relative appendage.

When the helicopter is in high-speed forward flight, the aerodynamic wash generated by the fuselage and the main rotor significantly disturb the airflow that strikes the portions of the appendages next to the fuselage.

In consequence, these portions are aerodynamically "in the shadow" and do not effectively contribute to the creation of the second aerodynamic force necessary for stabilizing the helicopter longitudinally.

There is therefore awareness in the industry of the need to optimize the aerodynamic behaviour of the tailplane so as to increase the helicopter's longitudinal stability in forward flight while, at the same time, limiting the nose-up phenomenon in low-speed conditions.

There is also awareness in the industry of the need to optimize the aerodynamic behaviour of the tailplane and the fin for the angles of attack characteristic of forward flight, lateral flight and the low-speed phases of landing/take-off, limiting or even avoiding any increase in dimensions and/or maximum aerodynamic force generated at the angles of attack typical of stalling. More specifically there is significant awareness in the industry of the need to have available a tailplane, which enables to reduce as much as possible the impact of the downward airflow generated by the main rotor at low speed.

There is significant awareness in the industry of the need to have available a tailplane, which enables to raise the aerodynamic efficiency of the tailplane as much as possible.

EP-A-2878536 discloses a helicopter according to the preamble of claim 1, a kit for a helicopter according to the preamble of claim 12 and a method of reconfiguring a helicopter according to the preamble of claim 15.

DISCLOSURE OF INVENTION

The object of the present invention is to produce a helicopter that enables satisfying at least one of the above-stated needs in a simple and inexpensive manner.

According to the invention, this object is achieved by a helicopter according to claim 1.

The present invention also relates to a kit for a helicopter according to claim 12.

The present invention also relates to a method of reconfiguring a helicopter according to claim 15.

BRIEF DESCRIPTION OF THE DRAWINGS

For a better understanding of the present invention, a preferred non-limitative embodiment thereof is described hereinafter, purely by way of example and with the aid of the accompanying drawings, in which:

FIG. 6 is a perspective view of the details of FIGS. 4 and 5;

FIG. 7 is a side view of the details of FIGS. 4 to 6; and

FIG. 8 is a view on a further enlarged scale of some details of FIGS. 4 to 7.

BEST MODE FOR CARRYING OUT THE INVENTION

Figure 1:
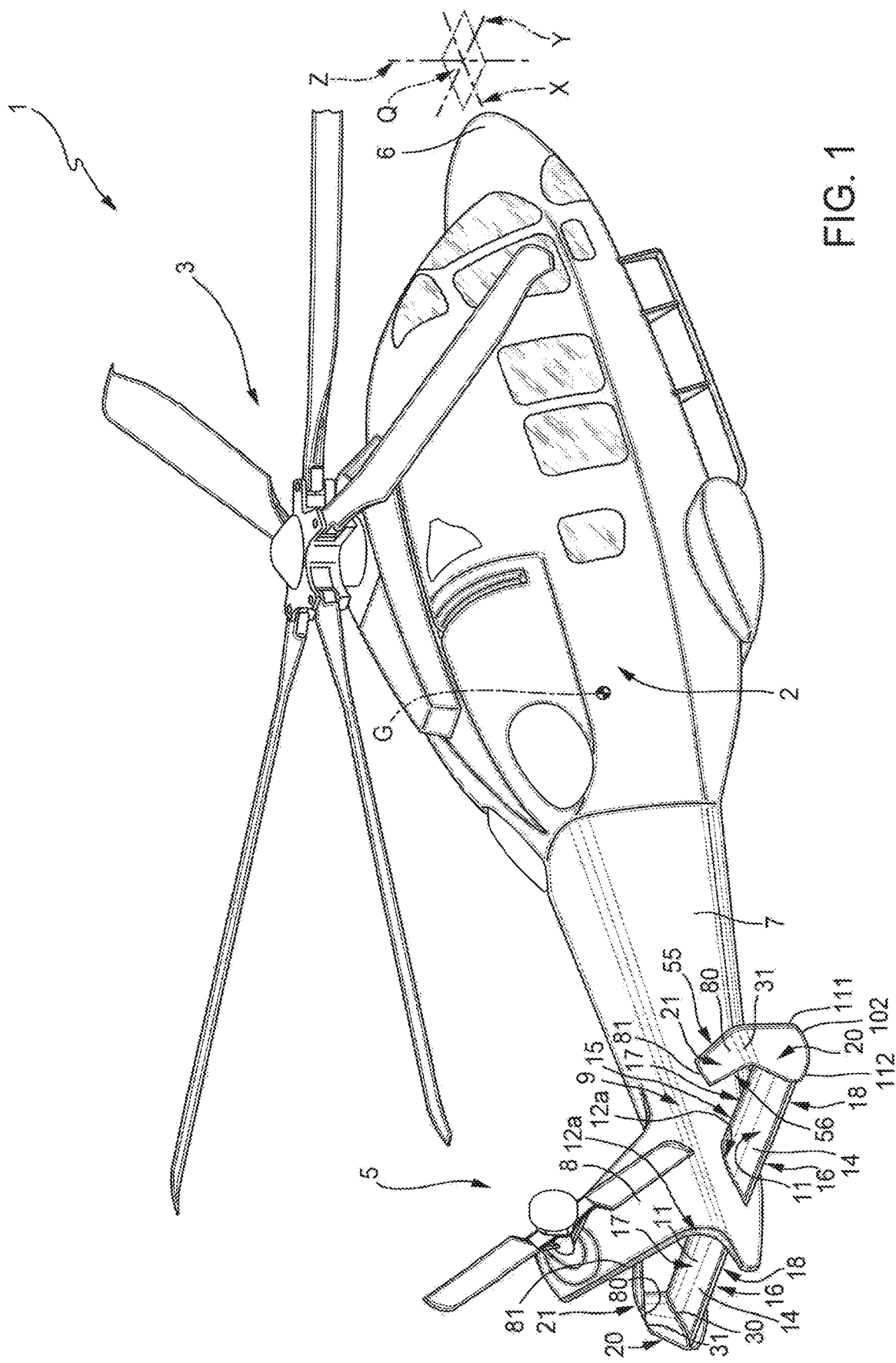
FIG. 1 is a perspective view of a helicopter made according to the present invention.

Referring to the accompanying drawings, reference numeral 1 indicates a helicopter made according to the dictates of the present invention.

The helicopter 1 basically comprises a fuselage 2, a main rotor 3 arranged on top of the fuselage 2 and a tail rotor 5.

The fuselage 2 comprises, at its opposite ends, a nose 6 and a tail boom 7.

It is Possible to Define:
a roll axis X of the helicopter 1 and corresponding to a longitudinal direction of extension of the fuselage 2;
a pitch axis Y orthogonal to the axis X; and
a yaw axis Z orthogonal to the axes X and Y.

The axes X, Y, Z are integral with the helicopter 1 and are incident at the barycentre G (not indicated in the correct position in the accompanying figures for simplicity of representation) of the helicopter 1.

It is Also Possible to Define:
a plane P orthogonal to the axis Y and parallel to the axes X, Z;
a plane Q orthogonal to the axis Z and parallel to the axes X, Y.

In particular, the plane P is a longitudinal plane of the helicopter 1 and the plane Q is a transversal plane of the helicopter 1.

It should be noted that hereinafter in this description, terms such as "above", "below", "lateral", "at the front", "at the rear" and the like are used with reference to a normal forward direction of the helicopter 1 in forward flight at constant altitude, i.e. a condition in which axis Z is vertical and axes X, Y are horizontal.

The main rotor 3 is adapted to provide thrust with a main component parallel to the axis Z so as to enable sustaining the helicopter 1 in the air, the forward or backward movement parallel to the axis X and the lateral movement in both directions parallel to the axis Y.

The tail rotor 5 is adapted to provide thrust with a main component parallel to the axis Y. This thrust generates torque about the axis Z in the opposite direction to the reaction torque acting on the fuselage 2 following operation of the main rotor 3, so as to control the yaw angle of the helicopter 1.

The nose 6 and the tail boom 7 are opposite to each other along the longitudinal axis X of extension of the helicopter 1.

The Helicopter 1 Also Comprises:
a fin 8 projecting in a cantilever fashion from the top of the tail boom 7, at the end opposite the nose 6; and
a tailplane 9 projecting in a cantilever fashion from the tail boom 7 below the fin 8 and adapted to stabilize the helicopter 1 longitudinally, namely along the axis X.

The fin 8 supports the tail rotor 5.

The tailplane 9 is adapted to generate an aerodynamic force with a main component parallel to the axis Z, so as to longitudinally stabilize the helicopter 1 in forward flight, i.e. to make the attitude of the helicopter 1 stable with regard to rotation about the axis Y.

In greater detail, the tailplane 9 comprises a pair of stabilizers 14 arranged on respective mutually opposite sides of the tail boom 7.

In the following description, reference will be made to just one stabilizer 14, as the stabilizers 14 are identical to one another.

The stabilizer 14 has a length parallel to the axis Y, a width parallel to the axis X and a thickness parallel to the axis Z.

The stabilizer 14 comprises a load-bearing surface 11, which is configured to generate lift/negative lift with a main component parallel to the axis Z.

The Surface 11 of the Stabilizer 14 is, in Turn, Delimitated by:
a leading edge 15 facing the nose 6 and defining a first most forward end edge of the stabilizer 14;
a trailing edge 16 opposite to the leading edge 15 along the axis X and defining a second most rearward end edge of the stabilizer 14;
a top surface 17 delimited between the leading edge 15 and the trailing edge 16 and defining an upper surface of the stabilizer 14; and
a bottom surface 18 delimited between the leading 15 and trailing 16 edges on the opposite side of the top surface 17, and defining a lower surface of the stabilizer 14.

The surface 11 also comprises a pair of end edges 12a, 12b opposite to each other and parallel to the axis Y. The end edge 12a of each surface 11 is fixed to the tail boom 7.

The surface 11 has a chord B (FIGS. 3 and 4) joining in a rectilinear way the leading edge 15 and the trailing edge 16 parallel to the axis X.

The length of the chord B is constant.

Advantageously, the Stabilizer 14 Comprises:
a plate 20 projecting in a cantilever fashion transversely to the surface 11; and an appendage 21 generating one second aerodynamic force, connected to the respective plate 20, and facing at a distance from the surface 11;

the appendage 21 in turn comprises:
- a root end 80 connected to the plate 20;
- a free end 81 spaced from the tail boom 7 and from the fin 8, and opposite to the root end 80;
- a leading edge 55;
- a trailing edge 56 opposite to the leading edge 55;
- a chord C1 (FIGS. 2, 6 and 7) parallel to axis X and joining in a rectilinear way the leading edge 55 and the trailing edge 56 at the free end 81;
- a chord C2 parallel to the axis X and joining in a rectilinear way the leading edge 55 and the trailing edge 56 at the root end 80;

the chords C1 and C2 define a plane R (FIG. 5) tilted with respect to the plane Q.

Figure 5:
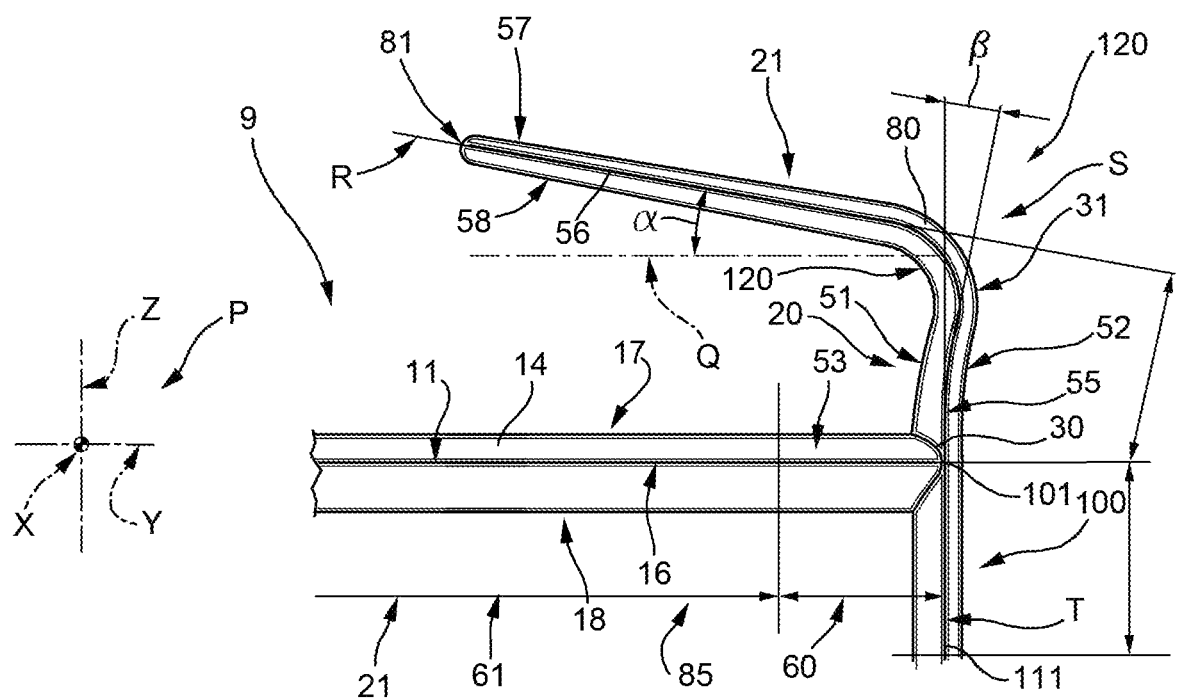
FIG. 5 is a front view of the details of the helicopter of FIG. 4.

In greater detail, the plane R is tilted with respect to the plane Q of a non-zero angle α ranging between 0 and 30 degrees, more specifically between 0 and 15 degrees (FIG. 5). It is therefore possible to desirably control the distance between the surfaces 11 and the appendages 21, minimizing the negative effects due to the mutual interference between the surfaces. The appendage 21 further extends from the plate 20 towards the fuselage of the helicopter 1. The appendage 21 further extends from the plate 20, at gradually increasing distances from the surface 11.

Figure 2:
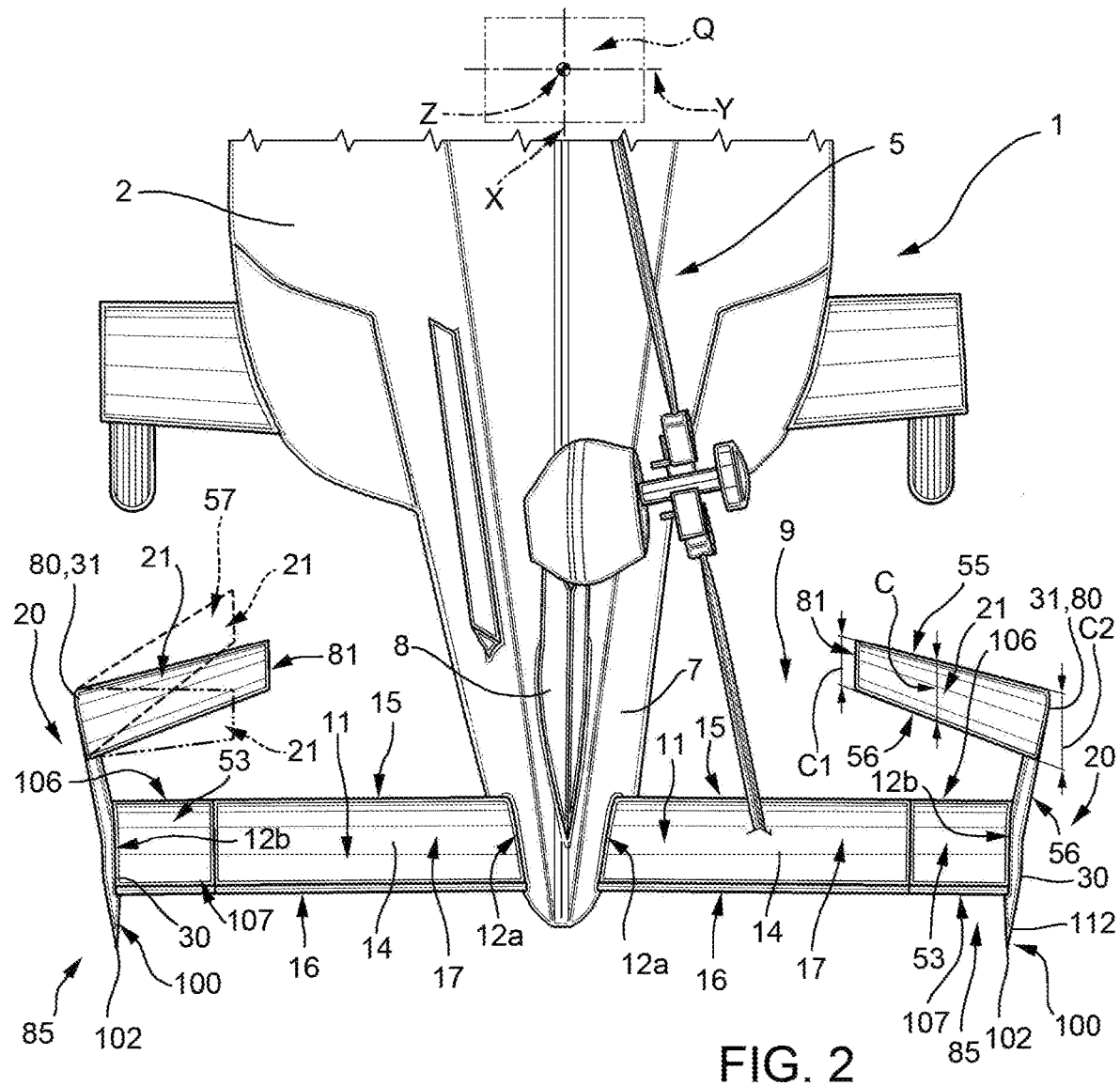
FIG. 2 is a view from above, on a highly enlarged scale, of a tail portion of the helicopter of FIG. 1, with parts removed for the sake of clarity.

In other words, the appendages 21 are mutually converging, from their respective plates 20 and on the side opposite to the respective surfaces 11 (FIG. 2).

In the case shown, the chord C1 is shorter than the chord C2.

More specifically, the length of the chords C of the appendage 21 decreases from the chord C2 towards the chord C1 (FIG. 2).

The appendage 21 further has a swept wing.

More specifically, the chord C1 has a section C3 projecting from the surface 11 in a plan view from above of the helicopter 1.

Figure 4:
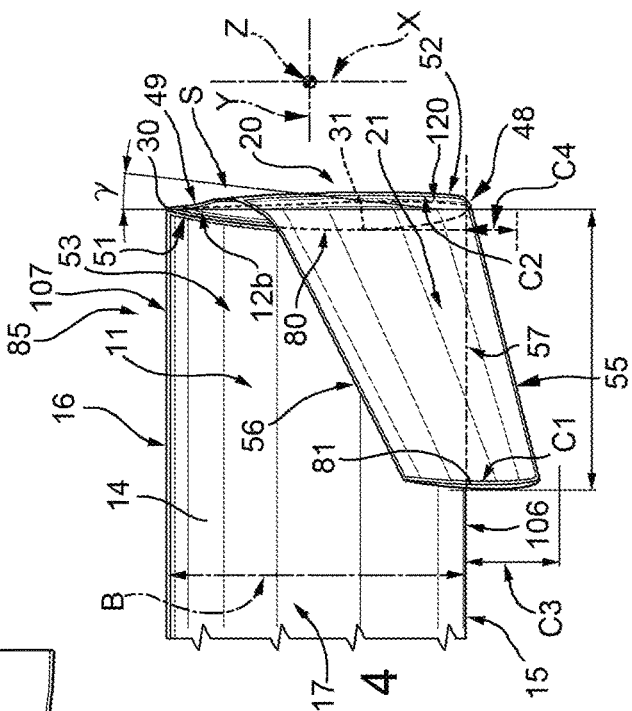
FIG. 4 is a view from above on a highly enlarged scale of some details of the helicopter of FIGS. 1 to 3.

Similarly, the chord C2 has a section C4 projecting from the surface 11 in a plan view from above of the helicopter 1 (FIG. 4).

The length of each section C3, C4 parallel to the axis X ranges between −50% and 50% of chord B of the surface 11.

The length of each section C3, C4 has a positive value when the section C3 projects from the leading edge 15 of the surface 11 towards the nose 6, in a plan view of the helicopter 1. Contrariwise, the length of each section C3, C4 has a negative value when the section C3, C4 projects from the trailing edge 16 of the surface 11 towards the tail boom 7, in a plan view of the helicopter 1.

In the case shown, the sections C3, C4 project from the leading edge 15 of the surface 11 towards the nose 6 of the helicopter 1.

The section C4 is also shorter than the section C3.

In consequence, the appendage 21 has a negative swept wing and it is staggered towards the nose 6 with respect to the surface 11.

In greater detail, an aerodynamic surface has a negative swept wing when it has a forward position (i.e. directed towards the nose 6) in a position corresponding to the quarter of the chord of the free end with respect to the same position corresponding to the quarter of the chord of the relative root portion (which will thus be rearward or directed to the opposite side of the fin 8).

In particular, the leading edge 55 is directed towards the nose 6 and defines a first end edge that is more forward than the appendage 21, with reference to a normal forward direction of the helicopter 1.

The trailing edge 56 is opposite to the leading edge 55 along the axis X, it is directed to the opposite side of the nose 6 and defines a second end edge that is more rearward than the appendage 21, with reference to a normal forward direction of the helicopter 1.

The Appendage 21 Also Comprises:
- a top surface 57 delimited between the leading edge 55 and the trailing edge 56 and defining an upper surface of the appendage 21; and
- a bottom surface 58 delimited between the leading edge 55 and the trailing edge 56 on the opposite side of the top surface 57, and defining a lower surface of the appendage 21.

The plate 20 is opposite to the fin 8 along the axis Y, it is connected to the surface 11 and projects in a cantilever fashion upwards from the edge 12*b* of the surface 11.

In greater detail, the plate 20 is delimited parallel to the axis Z by an edge 30 connected to edge 12*b* of the surface 11 and by an edge 31 opposite to edge 30.

Figure 3:
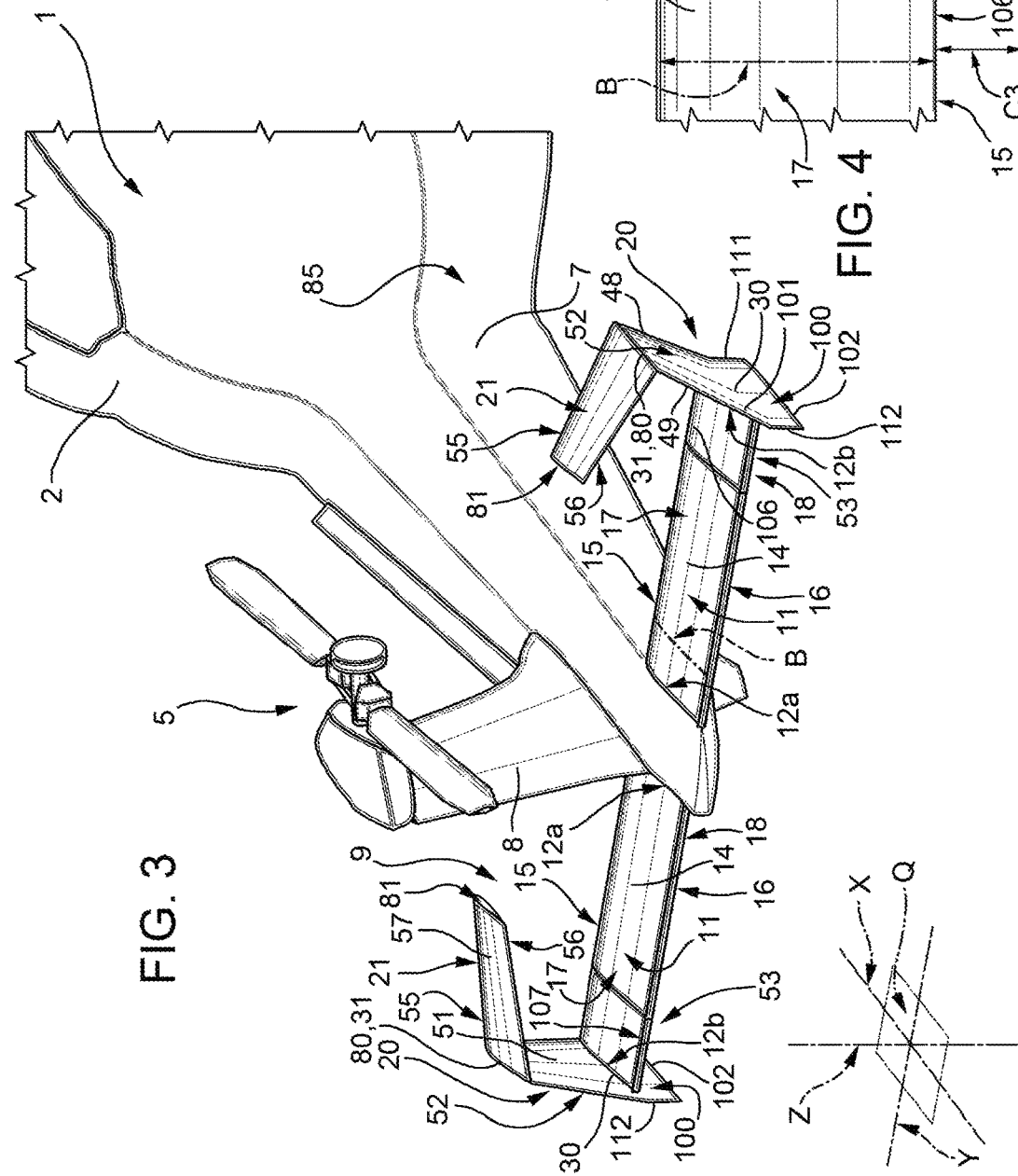
FIG. 3 is a perspective view on a highly enlarged scale of the tail portion of the helicopter of FIGS. 1 and 2, with parts removed for the sake of clarity.

In the case shown in FIGS. 2 and 3, the appendage 21 and the plate 20 are connected by a sharp edge. In particular, the edge 31 and the root end 80 are mutually coincident.

The edges 30, 31 extend parallel to the axis X.

The edge 31 is also arranged over the edge 30 and the appendage 21 is connected thereto.

In particular, the edge 31 is farther to the fin 8 than the edge 30. The edges 30 are, therefore, interposed between the edges 31 along the axis Y.

The Plate 20 is Also Delimited by:
- a leading edge 48 facing the nose 6 and defining a first most forward end edge of the plate 20;
- a trailing edge 49 opposite to the leading edge 48 along the axis X and defining a second most rearward end edge of plate 20;
- a wall 51 delimited between the leading edge 48 and the trailing edge 49 defining a surface directed towards the fin 8 of the plate 20; and
- a wall 52 delimited between the leading edge 48 and the trailing edge 49 on the side opposite to the wall 51, and defining a surface opposite to the fin 8 of the plate 51.

The plate 20 also comprises a plurality of chords D that extend, each one in a rectilinear way, between the leading edge 55 and the trailing edge 56 (FIG. 6).

The chords D1, D2 of the plate 20 at the edges 30, 31 define a plane S.

In the case shown, the plane S is orthogonal to the plane R, as shown by way of example in the enclosed FIG. 5.

In greater detail, planes S define with the axis Z an angle β ranging between −30 degrees and 30 degrees, even more preferably ranging between −20 degrees and 20 degrees (FIG. 5). It is therefore possible to desirably control the joint between the plates 20 and the appendages 21, minimizing the negative effects due to the mutual interference between the surfaces.

The angle β is oriented such to result positive when the planes S diverge between each other, with respect to the axis Z and such to result negative when the planes converge between each other with respect to the axis Z.

In the case shown, the planes S diverge between each other with respect to the axis Z, proceeding from the surface 11 towards the relative appendages 21 (FIG. 5).

The planes S also define an angle γ with the axis X ranging between −15 degrees and 15 degrees, even more preferably ranging between −10 degrees and 10 degrees (FIG. 4).

It is thus possible to modify the pressure field that is generated on elements 11 and 21, in particular a local depression, and to obtain, therefore, an efficiency value greater than the whole tailplane 9. The angle γ is oriented such to result positive/negative when the planes S converge/diverge between each other with respect to the axis X, and proceeding from the fin 8 towards the nose 6. In the case shown, the planes S also converge with each other with respect to the axis X, proceeding from the fin 8 towards the nose 6 (FIG. 4)

The Plate 20 Also Comprises, Proceeding from an Edge 30 Towards the Edge 31 (FIG. 7):
- a portion 90 spaced from the edge 31 and along which the length of the chord D is constant and equal to the value D1; and
- and a portion 91 spaced from the edge 30 and along which the length of the chord D is decreasing from value D1 to value D2.

Each tailplane 9 also comprises an additional element 100 projecting in a cantilever fashion 12b of the relative surface 11 on the opposite side of the relative plate 20. The plate 20 is arranged below the surface 11 (FIG. 5).

Each Element 100, in Particular, Comprises:
- a root end 101 connected to the edge 12b of the relative surface 11 and to the edge 30 of the relative plate 20;
- a free end 102 opposite to the root end 101.

Each Further Element 100 Also Comprises:
- a leading edge 111 directed towards the nose 6 and defining a first end edge that is more forward than the plate 20; and
- a trailing edge 112 opposite to the leading edge 111 along the axis X and defining a second end edge that is more rearward that the plate 20.

Each element 100 also comprises a plurality of chords E extending, each one in a rectilinear way, between the leading edge 111 and the trailing edge 112.

The length of the chord E at the root end 101 is referred to as E1.

The chord E assumes a gradually decreasing value from the root end 101 towards the free end 102 (FIG. 6).

The chords E define a plane T (FIG. 5).

The plane T is parallel to plane P and orthogonal to plane Q, in the case shown.

The distance between the chord E1 and the free end 102 along the plane T is lower than the distance between the chords D1, D2 along the plane S, in the case shown in FIG. 5.

Referring to FIG. 3, each surface 11 also comprises a pair of flaps 50, also known as Gurney flaps, applied to the respective opposite sides of the relative trailing edge 56, lying on the same plane and both orthogonal to the trailing edge 56 so as to form a T-shape.

Each surface 11, comprises, in particular a zone 53 next to the plate 20 parallel to the axis Y and interposed between a section 106 of the leading edge 15 and a corresponding section 107 of the trailing edge 16 parallel to the axis X (FIGS. 2 and 4).

In greater detail, each zone 53 defines an extension of the relative surface 11.

In particular, the leading edge, the trailing edge, the top surface and the bottom surface of each zone 53 are an extension of the leading edge 15, trailing edge 16, top surface 17 and bottom surface 18 of the relative surface 11.

In the case shown, the wingspan 60, namely the extension parallel to the axis Y, of the zone 53 ranges between approximately 5% and 35% of the wingspan 61 of the appendage 21, preferably between 10% and 20%.

Referring to FIG. 5, the distance between the chords D1 and D2 measured on the plane S—namely the "height" of the plate 20 ranges between 10% and 100% of the length of the chord B of the surface 11.

With reference to FIGS. 6 and 7, it is possible to identify a chord E2 arranged towards the free end 102 and having a length lower than the chord E1, nearer to the root end 101. The chord E2 is arranged parallel to the chord E1.

The length of the chord E is gradually decreasing from the length of the chord E1 to the length of the chord E2.

The distance between the chords E1 and E2 measured on the plane T-namely the height of the element 100 ranges between 10% and 100% of the length of the chord B of the surface 11.

The length of the chord C2 ranges between 20% and 100% of the length of the chord B of the surface 11.

The length of the chord C1 ranges between 20% and 100% of the length of the chord C2.

Alternatively, as shown in FIGS. 1 and 4 to 8, the stabilizer 14 comprises a joint portion 120 interposed between the root end 80 of the appendage 21 and the edge 31 of the plate 20.

The portion 120 extends, from the edge 31 towards the end 80, at a distance gradually increasing from the surface 11 and gradually decreasing from the fin 8.

The length of the chord of the portion 120 gradually reduces from value D2 to value C2.

The plates 20, the appendage 21, the zone 53 of the stabilizer 14 and the Gurney flaps 50 form a reconfiguration kit 85 (FIG. 2) for a stabilizer of a helicopter comprising the only surface 11.

Operation of the helicopter 1 is described starting from low-speed forward flight or hovering conditions typical, for example, of the phases of take-off/landing.

In this condition, the reaction torque about the axis Z generated on the fuselage 2 by the operation of the main rotor 3 is substantially balanced by the tail rotor 5. In fact, due to the low or null speed of the helicopter 1, the aerodynamic force generated by the fin 8 is negligible.

Furthermore, in this condition, the wash directed downward from the main rotor 3 towards the tail boom 7 strikes the stabilizers 14 of the tailplane 9.

The appendages 21 arranged above the surfaces 11 obstruct the passage of this wash towards the surfaces 11, which are therefore subjected to a particularly low or null downward thrust due to the wash of the main rotor 3.

Moreover, the small overall extension of the appendages 21 enable further reducing the downward thrust that this wash exerts on the tailplane 9.

In consequence, the nose-up moment about the axis Y generated by this thrust is reduced, with a consequent reduction in attitude variation of the helicopter 1 and in the corrections required of the pilot during the phases of take-off/landing.

Furthermore, in these conditions, the tailplane 9 generates aerodynamic thrust with a component parallel to the axis Z that enables keeping the helicopter 1 in stable equilibrium with respect to translation along the axis Z and rotation about the axis Y.

The presence of the fuselage 2 disturbs the aerodynamic flow that strikes the tailplane 9.

The kit 85 is used to reconfigure a helicopter equipped with stabilizers that each comprise only the surface 11 without the relative zone 53.

In greater detail, the zones 53 of the kit 85 are placed side by side to the relative surfaces 11 along the axis Y and connected thereto, so as to define relative extensions thereof and such that the relative appendages 21 are faced at a distance from the respective surfaces 11 and have the relative free ends 81 spaced from the tail boom 7/fin 8 along the axis Y.

From an examination of the characteristics of the helicopter 1, the kits 85 and the method according to the present invention, the advantages that can be attained therewith are evident.

In particular, the appendages 21 of the stabilizers 14 generate an aerodynamic force, and also have free respective ends 81 spaced from the tail boom 7/fin 8 and the relative planes R tilted with respect to Q of the angle α.

In this way, in high-speed conditions, the aerodynamic forces of lift/negative lift generated by the appendages 21 along the axis Z are added to those generated by the surfaces 11 and contribute, on one hand, as a prevailing effect for increasing the longitudinal stability of the helicopter 1.

On the other hand, since the appendages 21 are spaced from the fin 8, the stabilizers 14 are less heavy and less bulky than the stabilizers of the known solutions described in the introductory part of this description, with obvious advantages for the helicopter 1.

This weight reduction is obtained without any penalization regarding the aerodynamic force generated by stabilizers 14, as the fuselage 2 and the main rotor 3 significantly disturb the airflow that arrives in the area interposed between the appendages 21 and the fin 8, making it rather inefficient to generate an aerodynamic force in this area.

In other words, the tailplane 9 enables a high degree of longitudinal stability of the helicopter 1 with reduced weight.

In low-speed conditions, the surfaces 11 are in the turbulent wash of the appendages 21. The downward thrust generated by the wash of the main rotor 3 on the tailplane 9 is thus reduced with respect to traditional solutions, reducing the tendency of the helicopter 1 to assume a nose-up attitude and improving the pilot's comfort and visibility during landing operations.

The Applicant has observed that due to the fact that the appendages 21 have respective free ends 81 it is possible to further reduce the thrust downwards generated by the flow of the rotor 3 on the tailplane 9. The presence of the free ends 81 also allows to substantially reduce the overall induced resistance of the tailplane 9, consequently improving the aerodynamic efficiency thereof.

Summarizing, the Applicant has observed that the introduction of the appendages 21, enables raising the lift slope of the lift coefficient with respect to the angle of attack, thereby reducing the increase in maximum lift in stall conditions.

Since the angles of attack of the tailplane 9 corresponding to the normal flight conditions of the helicopter 1—forward flight, lateral flight, hovering, low-speed flight during take-off/landing, are less than the stall angle of attack, the appendages 21, enable increasing the value of the aerodynamic forces generated by the tailplane 9 at the angles of attack typical of operation of the helicopter 1.

The planes S define with the axis Z the angle β ranging between −30 degrees and +30 degrees, preferably ranging between −20 degrees and +20 degrees.

It is therefore possible to desirably control the joint between the plates 20 and the appendages 21, minimizing the negative effects due to the mutual interference between the surfaces.

The planes S also define with the axis X an angle γ ranging between −15 degrees and 15 degrees, preferably ranging between −10 degrees and 10 degrees.

It is therefore possible to modify the pressure field generated on elements 11, 20 and 21, in particular a local depression, and obtain a desired efficiency value that is greater than the entire tailplane 9. The sections C3 and C4 of each appendage 21 have a length parallel to the axis X ranging between −50% and 50% of the chord B of the relative surface 11.

Due to that, the appendages 21 have a swept wing and are staggered with respect to the relative surfaces 11 along the axis X. It is therefore possible to control the interaction between the airflow directed downwards generated by the rotor 3 and the tailplane 9 during the low-speed flight conditions, partially placing the surface 11 in trail with appendage 21.

The flaps 50 applied orthogonally to the trailing edges 56 of the surfaces 11 enable increasing the aerodynamic force generated by the tailplane 9 against a small increase in aerodynamic resistance. In particular, due to the T-shape of the flaps 50 and of the respective trailing edges 56, it is possible to increase the lift/negative lift generated by the surfaces 11 and the relative maximum value of the lift coefficient as the angle of attack changes.

The kits 85 enable reconfiguring a helicopter with a traditional tailplane by simply fixing the zone 53 to the surface 11 so as to define its extension and to arrange the appendage 21 facing the surface 11 and spaced from the tail boom 7/fin 8.

Since the appendage 21 is spaced from the tail boom 7/fin 8, the application of the kit 85 does not require any action on the tail boom 7, enormously simplifying the reconfiguration of the helicopter 1.

The T-shaped flaps 50 are particularly advantageous when incorporated in the kit 85. In fact, the T-shape allows increasing the lift generated by the stabilizers 14 without altering the attitude of the helicopter 1 with respect to a condition in which the kit 85 was not present.

It is clear that modifications and variants can be made to the helicopter 1, the kit 85 and the method set forth herein without departing from the scope defined in the claims.

In particular, each stabilizer 14 might comprise at least a first additional appendage 21 arranged on the side of the top surface 17 of the surface 11 along the axis Z and spaced from the fin 8 along the axis Y and at least a second additional appendage 21 arranged on the side of the bottom surface 18 of the surface 11 along the axis Z and spaced from the tail boom 7 along the axis Y.

In particular, the first additional appendages 21 might be more than one and/or the second additional appendages 21 may be more than one.

Alternatively, each stabilizer 14 might comprise at least two first additional appendages 21 arranged on the side of the top surface 17 of the surface 11, spaced from the fin 8 and staggered from the axis X. Alternatively, each stabilizer 14 might comprise at least two second additional appendages 21 arranged on the side of the bottom surface 18 of the surface 11, spaced from the fin 8 and staggered along the axis X.

The first and second additional appendages 21 allow to increase the aerodynamic force generated by the tailplane 9 and, therefore, the stabilization effect at high-speed, further increasing the shielding effect of the surface 11 against the downward flow generated by the rotor 3. Alternatively, the length of sections C3, C4 of each appendage 21 might be the same. In that case, each appendage 21 would simply be staggered with respect to the relative surface 11 towards the nose 6 or towards the tail boom 7, without any geometric swept wing.

The chords B, C, D, E of the surface 11, appendage 21, plate 20 and element 100 may be bent namely obtained by the rotation of the relative planes R, S, T of a constant angle. In that case, the planes R; S; T would identify the planes defined by the chords C1, C2; D1, D2; E1, E2 with no bend.

The invention claimed is:

1. A helicopter comprising:
   a fuselage elongated along a first longitudinal axis (X) of said helicopter and extending between a nose and a tail boom of the helicopter from which a fin projects;
   a tailplane arranged at said tail boom and transversal to the tail boom;
   said tailplane defining a pair of first aerodynamic surfaces generating, in use, respective first aerodynamic forces and elongated along a second axis (Y) transversal to said first axis (X);
   said first and second axes (X, Y) defining a first plane (Q);
   a pair of first elements transversal to said first respective aerodynamic surfaces; and
   a pair of second aerodynamic surfaces generating, in use, respective second aerodynamic forces, connected to said respective first elements, and facing and spaced from said respective first aerodynamic surfaces;
   each of said second aerodynamic surface comprising, in turn:
   a first root end connected to said respective first element;
   a first leading edge;
   a first trailing edge opposite to the said first leading edge;
   a first chord (C2) joining said first leading edge and said first trailing edge at said first root end parallel to said first axis (X); and
   a second chord (C1) joining said first leading edge and said first trailing edge at a second free end parallel to said first axis (X);
   said first and second chord (C2, C1) defining a second plane (R) tilted with respect to said first plane (Q);
   characterized in that each of said aerodynamic surface comprises said second free end being spaced from said tail boom and opposite to said first root end;
   said second chord (C1) being defined at said second free end;
   wherein each second aerodynamic surface of said pair of second aerodynamic surfaces has respective fifth chords (C) with lengths gradually decreasing proceeding from the said respective first element and towards said respective second free end and proceeding from said first chord (C2) to said second chord (C1);
   wherein each said second aerodynamic surface is tapered proceeding from said first root end towards said second free end;
   wherein each of said first element comprises:
      a third end connected to said respective first aerodynamic surface;
      a fourth end connected to said respective second aerodynamic surface and opposite to said third end;
      a second leading edge;
      a second trailing edge;
      a third chord (D1) joining said second leading edge and second trailing edge at said third end parallel to said first axis (X);
      a fourth chord (D2) joining said second leading edge and second trailing edge at said fourth end parallel to said first axis (X);
      said third and fourth chord (D1, D2) defining a third plane (S);
      said third plane (S) being tilted with respect to said first plane (Q) at a second non-zero angle ($\gamma$) between −15 and 15 degrees and/or being tilted with respect to a third axis (Z) orthogonal to said first plane (Q) at a third non-zero angle ($\beta$) between −30 and 30 degrees,
   and also comprising:
      a pair of second elements, each said second element being connected to a respective first aerodynamic surface and to said respective first element at a respective third root end, and extending on the opposite side of said respective first element with respect to said respective first aerodynamic surface, and each said second element including a fourth free end opposite to said respective third root end, a curved third leading edge, and a third trailing edge opposite to said curved third leading edge,
      wherein a length of the second elements along the first axis (X) decreases from the third root end toward the fourth free end, and
      wherein at least one of the second leading edge and the second trailing edge are oriented towards the nose of the helicopter in relation to the second axis (Y).

2. The helicopter according to claim 1, characterized in that said first and second planes (Q, R) are tilted between each other at a non-zero angle ($\alpha$) between 0 and 30 degrees.

3. The helicopter according to claim 2, wherein said non-zero angle ($\alpha$) is between 0 and 15 degrees.

4. The helicopter according to claim 1, characterized in that said second aerodynamic surfaces are convergent between each other, starting from first respective elements and on the opposite side of said first aerodynamic surfaces.

5. The helicopter according to claim 1, characterized in that it each said first element comprises a respective portion spaced from said first relative aerodynamic surface and connected to said relative second aerodynamic surface;
   each of said portion having respective sixth chords (D) gradually decreasing, proceeding towards said respective second aerodynamic surface;
   said sixth chords (D) having gradually a length greater than or equal to said first chords (C1), proceeding towards said respective second aerodynamic surface (21).

6. The helicopter according to claim 1, characterized in that: (a) each said second aerodynamic surface extends starting from the relative first element towards said nose of said helicopter and each second aerodynamic surface has a negative swept wing and/or (b) each second aerodynamic surface is staggered with respect to said first aerodynamic surface.

7. The helicopter according to claim 1, characterized in that said third planes(S) extend diverging between each other starting from said first respective aerodynamic surfaces with respect to a third axis (Z) orthogonal to said first axis (X) and to said second axis (Y).

8. The helicopter according to claim 1, characterized in that said third planes(S) extend converging between each other with respect to said third axis (Z), proceeding from a top of said helicopter towards a bottom of said helicopter.

9. The helicopter according to claim 1, characterized in that it comprises
- a seventh chord (E1) joining said third leading edge and said third trailing edge at said third root end and parallel to said first axis (X); and
- an eighth chord (E2) joining said third leading edge and said third trailing edge at said fourth free end and parallel to said first axis (X);
- said seventh and eighth chord (E1, E2) defining a fourth plane (T) tilted with respect to said third plane (S) and orthogonal to said first plane (Q).

10. An upgrade kit for a helicopter comprising:
- a zone fixable to a first aerodynamic surface defined by a tailplane of a helicopter so as to define an extension thereof along a first axis (Y);
- at least a first element transversal to said zone; and
- a second aerodynamic surface transversal to said first element, adapted to generate, in use, an aerodynamic force and arranged on the opposite side of said element with respect to said aerodynamic surface;
- each said zone defining a first leading edge and a second trailing edge opposite each other along a second axis (X) transversal from said first axis (Y);
- said first axis (Y) and second axis (X) defining a first plane (Q);
- each said second aerodynamic surface comprising:
  - a first root end connected to said respective first element;
  - a second leading edge;
  - a second trailing edge opposite to said second leading edge;
  - a first chord (C1) joining said second leading edge and said trailing edge at a second free end and parallel to said second axis (X);
  - a second chord (C2) joining said second leading edge and said second trailing edge at said first root end and parallel to said first axis (X);
- said first and second chords (C1, C2) defining a second plane (S) tilted with respect to said first plane (Q);
- characterized by comprising said second free end opposite to said first root end;
- said second chord (C2) being defined at said second free end;
- wherein said second plane has respective fifth chords (C) with lengths gradually decreasing proceeding from the said respective first element and towards said second free end and proceeding from said first chord (C2) to said second chord (C1);
- wherein each said second aerodynamic surface is tapered proceeding from said first root end towards said second free end;
- wherein each of said first element comprises:
  - a third end connected to said respective first aerodynamic surface;
  - a fourth end connected to said respective second aerodynamic surface and opposite to said third end;
  - a second leading edge;
  - a second trailing edge;
  - a third chord (D1) joining said second leading edge and second trailing edge at said third end parallel to said first axis (X);
  - a fourth chord (D2) joining said second leading edge and second trailing edge at said fourth end parallel to said first axis (X);
- said third and fourth chord (D1, D2) defining a third plane (S);
- said third plane (S) being tilted with respect to said first plane (Q) of at a second non-zero angle (γ) between −15 and 15 degrees and/or being tilted with respect to a third axis (Z) orthogonal to said first plane (Q) at a third non-zero angle (β) between −30 and 30 degrees, and also comprising
- a pair of second elements, each said second element being connected to a respective first aerodynamic surface and to said respective first element at a respective third root end, and extending on the opposite side of the said respective first element with respect to said respective first aerodynamic surface, and each said second element including a fourth free end opposite to said respective third root end, a curved third leading edge, and a third trailing edge opposite to said curved third leading edge,
- wherein a length of the second elements along the first axis (X) decreases from the third root end toward the fourth free end, and
- wherein at least one of the second leading edge and the second trailing edge are oriented towards the nose of the helicopter in relation to the second axis (Y).

11. The kit according to claim 10, characterized in that said first and second plane (S, Q) are tilted between each other at a non-zero angle between 0 and 30 degrees.

12. The kit according to claim 11, characterized in that said non-zero angle is between 0 and 15 degrees.

13. The kit according to claim 10, characterized in that each said first element comprises a first edge connected to said zone and a second edge opposite to said first edge and connected to said second aerodynamic surface;
- each said second aerodynamic surface extending at gradually increasing distances from said zone along a third axis (Z) orthogonal to said first plane (Q), proceeding from said edge of said relative first element.

14. The kit according to claim 10, wherein said second non-zero angle (γ) is between −10 and 10 degrees and the third non-zero angle (β) is between −20 and 20 degrees.

15. An upgrade method for a helicopter; said helicopter comprising:
- a fuselage elongated along a first longitudinal axis (X) of said helicopter and extending between a nose and a tail boom of the helicopter;
- a tailplane arranged at said tail boom and transversal to the tail boom;
- said tailplane defining a pair of first aerodynamic surfaces generating, in use, respective first aerodynamic forces and elongated along a second axis (Y) transversal to said first axis (X);
- said first and second axis (X, Y) defining a first plane (Q);
- said method comprising the steps of:
  - i) arranging at least a first element transversely to said first aerodynamic surface;
  - ii) connecting at least a second aerodynamic surface generating a second aerodynamic force to said first element, and in a position facing and spaced from said first aerodynamic surface;
- each said second aerodynamic surface comprising:
  - a first root end connected to the said respective first element;
  - a first leading edge;
  - a first trailing edge opposite to said first leading edge;
  - a first chord (C1) joining said first leading edge and said first trailing edge at said second free end and parallel to said first axis (X);

a second chord (C2) joining said first leading edge and said first trailing edge at said first root end and parallel to said first axis (X);

said first and second chords (C1, C2) defining a second plane (S) tilted with respect to said first plane (Q);

said method being characterized in that each said aerodynamic surface comprises a second free end spaced from said tail boom and a fin projecting from said tail boom, and opposite to said first root end;

said second chord (C2) being defined at said second free end;

wherein said second aerodynamic surface has respective fifth chords (C) with lengths gradually decreasing proceeding from the said respective first element and towards said respective second free end and proceeding from said first chord (C2) to said second chord (C1);

wherein each said second aerodynamic surface is tapered proceeding from said first root end towards said second free end;

wherein each of said first element comprises:
- a third end connected to said respective first aerodynamic surface;
- a fourth end connected to said respective second aerodynamic surface and opposite to said third end;
- a second leading edge;
- a second trailing edge;
- a third chord (D1) joining said second leading edge and second trailing edge at said third end parallel to said first axis (X);
- a fourth chord (D2) joining said second leading edge and second trailing edge at said fourth end parallel to said first axis (X);
- said third and fourth chord (D1, D2) defining a third plane (S);
  - said third plane (S) being tilted with respect to said first plane (Q) at a second non-zero angle (γ) between −15 and 15 degrees and/or being tilted with respect to a third axis (Z) orthogonal to said first plane (Q) at a third non-zero angle (β) between −30 and 30 degrees, and also comprising
a pair of second elements, each said second element being connected to a respective first aerodynamic surface and to said respective first element at a respective third root end, and extending on the opposite side of said respective first element with respect to said respective first aerodynamic surface, and each said second element including a fourth free end opposite to said respective third root end, a curved third leading edge, and a third trailing edge opposite to said curved third leading edge, wherein a length of the second elements along the first axis (X) decreases from the third root end toward the fourth free end, and wherein at least one of the second leading edge and the second trailing edge are oriented towards the nose of the helicopter in relation to the second axis (Y).

* * * * *